Feb. 13, 1923.

M. POLLOCK.
TRAVELING BAG.
FILED JUNE 17, 1921.

1,445,236.

INVENTOR.
MORRIS POLLOCK.
BY Henry Hech
ATTORNEY.

Patented Feb. 13, 1923.

1,445,236

UNITED STATES PATENT OFFICE.

MORRIS POLLOCK, OF CHICAGO, ILLINOIS, ASSIGNOR TO ROYAL LEATHER GOODS CO., OF CHICAGO, ILLINOIS, A CORPORATION OF ILLINOIS.

TRAVELING BAG.

Application filed June 17, 1921. Serial No. 478,304.

*To all whom it may concern:*

Be it known that I, MORRIS POLLOCK, a citizen of the United States, residing at 426 South Clinton Street, Chicago, Illinois, have invented certain new and useful Improvements in Traveling Bags, of which the following is a specification.

The invention relates to portable cases or receptacles known as traveling or hand bags. Traveling bags of this character include two bail members hingedly connected at the ends and have secured thereto the case or bag made of pliable material. The bail members are equipped with a lock at the central portion and with catches spaced from said lock to prevent separation of the members when the bag is closed.

It is an object of the invention to provide means for preventing easy opening of the catches by accidental contact therewith so that the contents of the bag are always properly held therein.

A further object aims at providing additional securing means for the catches which have frictional contact therewith but permit opening thereof when desired.

A still further object constitutes the provision of reinforcing members which have a dual function of holding the catches and reinforcing the bail members to thereby prolong the life of the bag.

With these and other objects in view, which will appear as the description of the invention proceeds, the latter comprises the means set forth in the following specification, particularly pointed out in the claims forming a part thereof, and illustrated in the accompanying drawing, in which:

Figure 1:
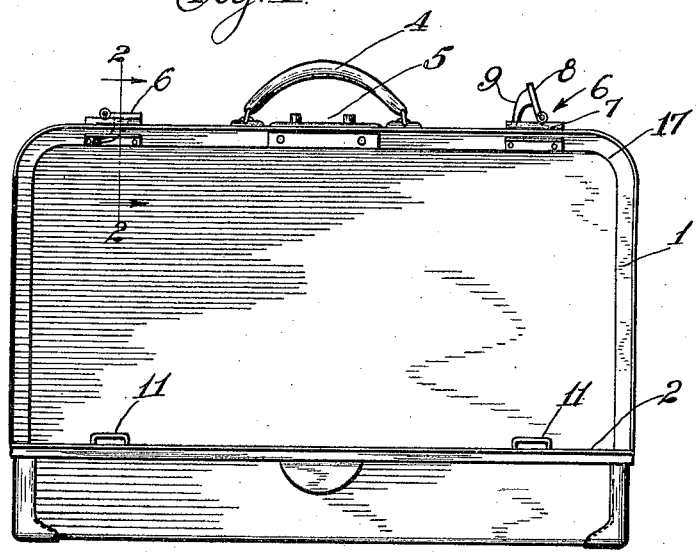
Fig. 1 is an elevational view of a bag in open condition to which the invention has been applied.

Referring to the drawing, 1 designates a bail member which is of angular cross-section and is hingedly connected at the ends to a companion bail member 2. The bag 3, of leather or other suitable pliable material, is secured to the bail member in an approved or convenient manner. The particular form of the bag, the manner of securing the bag body to the bail members, or the lock for securing the bag in closed condition do not form parts of the invention and therefore a brief reference to these parts will suffice.

Figure 2:
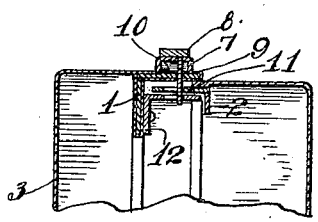
Fig. 2 is a section on the line 2—2 of Fig. 1.
Figure 3:
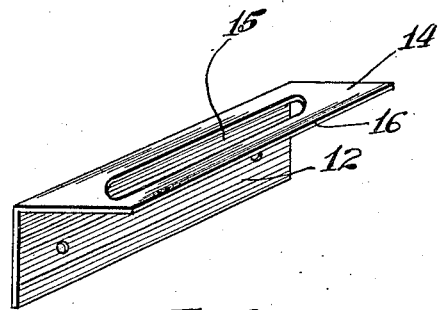
Fig. 3 is a perspective view of the reinforcing member.

To the bail member 1 a handle 4 is secured to encompass the lock 5. Spaced at equal distances from the lock, catches 6 are provided each of which comprises a base 7 to which is hingedly connected a plate 8 formed with a curved tongue 9 which in the closed position of the catches extends through an opening 10 in the bail member 1 and through a coacting member 11 secured to the bail member 2. As is indicated in Fig. 2 an angular member 12 is secured to the depending leg of the bail member 1 such as by riveting or any other approved manner, and the horizontal leg 14 of the angular member 12 is provided with an elongated slot 15 at such distance from the free edge 16 that the tongue 9 of the catch 6 has contact with the longitudinal end wall of the slot 15. Attention is called to the fact that the angular members 12 constitute reinforcing elements for the bail members of the frame of the traveling bag and that by reason of the contiguity of the elements to the corners 17 of the bail members, the corners are also reinforced and stiffened to withstand strains to which they are subjected in the course of use. The provision of the angle members 12 merely increases the friction with which the catches 6 are held in closed position, without, however, precluding the possibility of opening the catches when this is desired. The reinforcing elements merely prevent accidental opening upon contact of the catch plates 8 with an exterior object.

While the drawing discloses the preferred embodiment of the invention, numerous changes and alterations may be made without departing from the spirit of the invention and all changes constituting departures within the scope of the invention are included as set out in the appended claims.

I claim:

1. A portable bag including a pair of bail members hingedly connected at their ends, a catch having a tongue and hingedly connected to one of said bail members, an eye secured to the other of said bail members and adapted to receive said tongue, and means secured to said catch equipped bail member for releasably retaining said catch in functional position, said eye being arranged between said catch and said means when the bag is closed.

2. A portable bag including a pair of bail members hingedly connected at their ends, a catch having a tongue and hingedly connected to one of said bail members, an eye secured to the other of said bail members and adapted to receive said tongue, and an angle piece secured to said catch equipped bail member and adapted to engage said catch tongue to retain the same in functional position.

3. A portable bag including a pair of bail members hingedly connected at their ends, a catch having a tongue and hingedly connected to one of said bail members, an eye secured to the other of said bail members and adapted to receive said tongue, and an angle member secured to said catch equipped bail member and adapted to receive in a slot the free end of said catch tongue, said tongue bearing against the edge of the slot.

4. A portable bag including a pair of bail members hingedly connected at their ends, catches having a tongue and hingedly connected to one of said bail members, eyes secured to the other of said bail members and adapted to receive the catch tongues, and angle members secured to said catch equipped bail member and adapted to receive in its slots the free end of said catch tongues, said tongues engaging the longitudinal edge of said slots to frictionally retain the catches in functional position.

In witness whereof I affix my signature.

MORRIS POLLOCK.